(No Model.)
J. CHADWELL.
HAND PLANTER.
No. 520,726. Patented May 29, 1894.
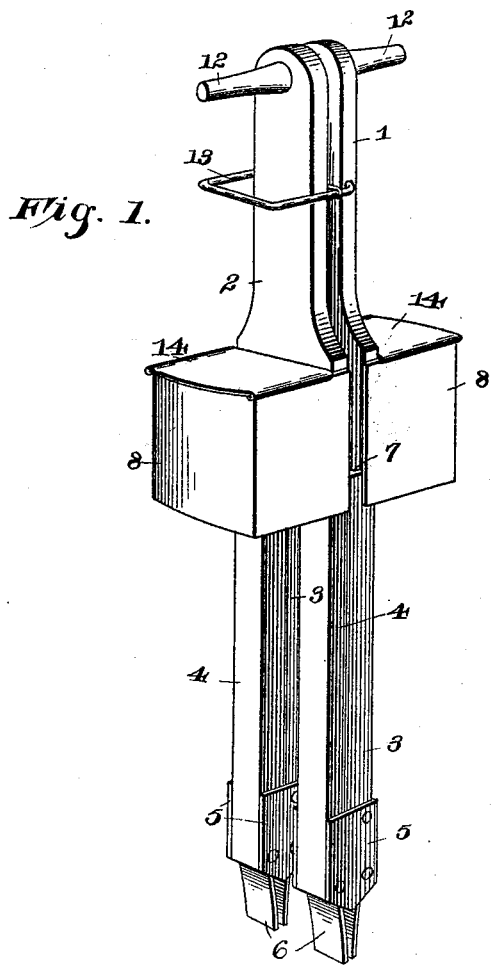
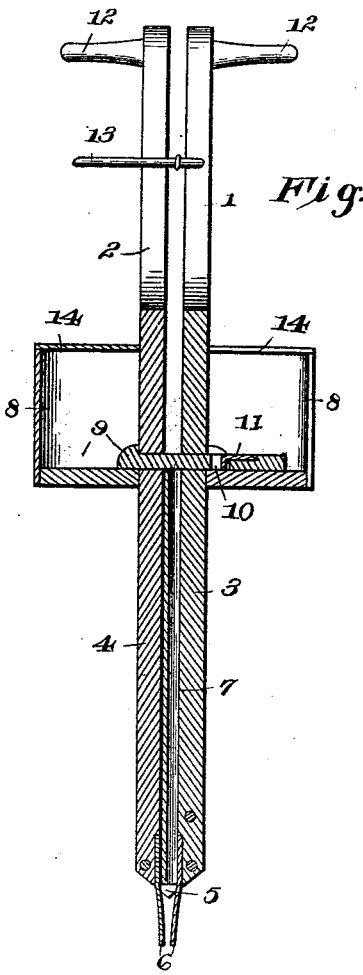
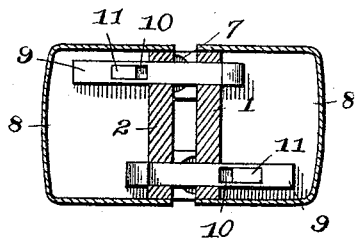
Witnesses
Inventor
James Chadwell,
by
Attorneys

UNITED STATES PATENT OFFICE.

JAMES CHADWELL, OF DEFOE, KENTUCKY.

HAND-PLANTER.

SPECIFICATION forming part of Letters Patent No. 520,726, dated May 29, 1894.

Application filed April 22, 1893. Serial No. 471,452. (No model.)

*To all whom it may concern:*

Be it known that I, JAMES CHADWELL, a citizen of the United States, residing at Defoe, in the county of Henry and State of Kentucky, have invented a new and useful Hand-Planter, of which the following is a specification.

My invention relates to hand planters; and has for its object to provide a hand operated planter, by which the seed may be dropped in spaced hills to enable the operator to plant two or more hills simultaneously; and to provide means whereby different kinds of seed may be planted in adjacent hills, as corn and pumpkin seed.

Further objects and advantages of the invention will appear in the following description, and the novel features thereof will be particularly pointed out in the claim.

In the drawings:—Figure 1 is a perspective view of a hand planter embodying my invention. Fig. 2 is a vertical sectional view. Fig. 3 is a horizontal sectional view.

Similar numerals of reference indicate corresponding parts in all the figures of the drawings.

1 and 2 designate similar members or sections of the improved planter, the lower portion of each of said members or sections being bifurcated to form parallel spaced legs 3 and 4. The lower end of the leg 4 of the member 1 and the lower end of the leg 3 of the same member, are hinged respectively to the extremities of the legs 3 and 4 respectively of the member 2, the lower extremities of all of said legs being fitted with spades 6. Hinges 5 preferably form the connection between the legs of the members. The leg 3 of each member or section is provided upon its inner side or side adjacent to the corresponding leg of the other member with a seed-tube or way 7, which terminates at its lower end between the planes of the spades 6 carried by that pair of legs, and each member or section carries a seed-hopper 8, which communicates with one of the tubes or ways 7. The openings between the hoppers and their respective seed-tubes or ways are controlled by seed-slides 9, which are secured respectively to one of the members or sections and fit slidably in opposite openings in the other member or section, whereby, when the upper ends of the members or sections are separated in the operation of planting, as hereinafter more particularly described, the slides are drawn out and their openings 10 are carried from the interiors of the hoppers to points directly over and in communication with the seed-tubes or ways. The size of the seed-openings 10 is regulated by means of auxiliary slides 11, whereby one or more seeds may be planted at one operation of the device. The members or sections are provided at their upper extremities with handles 12, whereby said members may be manipulated and the separation of the upper ends of the members or sections is limited by a bail or keeper 13 secured at its extremities to the member 1 and embracing the member 2. The hoppers are provided with sliding covers 14 provided with flanged lateral edges which engage corresponding flanges at the upper edges of the sides of the hoppers.

The bifurcations of the members or sections of the planter preferably extend from their lower ends to points adjacent to the planes of the under sides of the hoppers, whereby a free open space is provided between the two pairs of pivotally connected legs of the device, which prevents clogging with earth, &c., when in operation. By extending the bifurcations, as described, the insertion of the lower ends of the legs in the earth will dislodge any accumulation which may have resulted from a previous insertion. The interval between the pairs of connected legs may be varied in the manufacture of the device to plant the hills at any desired distance apart, as will be understood.

The operation of the device is as follows:— With the members or sections arranged in the relative positions shown in Figs. 1 and 2, or parallel with each other, the seed is received in the openings 10 in position to be removed from the hoppers, and therefore when the handles 12 are drawn apart to separate the upper ends of the members or sections in order to arrange the lower extremities of the opening spades 6 in contact, said openings 10 are arranged over the seed-tubes or ways. The seed, however, although allowed to drop to the spades, cannot escape, and therefore, when the spades are driven into the surface of the ground the seed is carried to the depth desired for planting. The handles are now pushed inward or toward each other to open the spades and allow the seed to fall into the opening formed in the ground.

Different kinds of seed, such as corn and pumpkin, may be simultaneously planted by arranging the same respectively in the hoppers, thus causing them to be planted in adjacent rows.

Various changes in the form, proportion, and the minor details of construction may be resorted to without departing from the spirit of the invention or sacrificing any of the advantages thereof.

Having described my invention, what I claim is—

The herein described hand planter, comprising twin opposite pivotally connected members or sections, which are bifurcated at their lower ends to form parallel spaced legs provided with terminal opening spades, said legs of the two members or sections being pivotally connected in pairs adjacent to their lower extremities, whereby when the upper ends of the members or sections are separated, the lower extremities of the spades carried by the members of each pair of connected legs, are brought together, seed-boxes or hoppers carried respectively by the members or sections upon their outer sides, seed-tubes or ways arranged upon the inner sides of one of the legs of each pair, seed-slides connected respectively to the members or sections and operating slidably in openings in the sides of the seed-boxes or hoppers of the opposite members or sections, said slides being provided with openings which are adapted to register with the seed-tubes or ways when the upper ends of the members or sections are separated, and means for regulating the size of the seed-openings in the seed-slides, substantially as specified.

In testimony that I claim the foregoing as my own I have hereto affixed my signature in the presence of two witnesses.

JAMES CHADWELL.

Witnesses:
G. W. BARTON,
W. S. THOMPSON.